United States Patent
Laubner et al.

(10) Patent No.: US 6,834,041 B2
(45) Date of Patent: Dec. 21, 2004

(54) APPARATUS AND METHOD FOR MONITORING THE SWITCHING PATHS OF A TIME/SPACE COUPLING NETWORK

(75) Inventors: Karsten Laubner, Munich (DE); Marcel-Abraham Troost, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 711 days.

(21) Appl. No.: 09/736,763

(22) Filed: Dec. 13, 2000

(65) Prior Publication Data

US 2001/0012274 A1 Aug. 9, 2001

(30) Foreign Application Priority Data

Dec. 17, 1999 (DE) ............................................ 19961149

(51) Int. Cl.[7] ........................ G01R 31/08; H04L 12/50; H04B 7/212; H04J 3/24
(52) U.S. Cl. ........................ 370/244; 370/369; 370/442; 370/475; 340/3.5
(58) Field of Search ................................ 370/244, 248, 370/370, 369, 230, 386, 471, 475, 442; 709/227–229; 340/2.28, 3.1, 3.5

(56) References Cited

U.S. PATENT DOCUMENTS

| | | | |
|---|---|---|---|
| 4,038,497 A | * 7/1977 | Collins et al. | 179/15 AT |
| 4,894,821 A | 1/1990 | Hayano | |
| 5,353,421 A | * 10/1994 | Emma et al. | 395/375 |
| 6,693,903 B1 | * 2/2004 | Shively | 370/370 |

FOREIGN PATENT DOCUMENTS

GB     2 062 411     5/1991

* cited by examiner

Primary Examiner—Duc Ho
(74) Attorney, Agent, or Firm—Morrison & Foerster LLP

(57) ABSTRACT

An apparatus and a method are provided for monitoring the switching paths of a time/space coupling network in a coupling network (SN), having an originating address generator (UAG) for generating an originating address (UA) to be switched, a target value address generator (SE) for producing an expected target value address, and a comparator apparatus (V) for acquiring and comparing a switched originating address (UA') on a predetermined output line (AKL) of the time/space coupling network (ZRKN) with the expected target value address. In this way, the time/space coupling network can be monitored or, respectively, tested reliably and completely.

14 Claims, 3 Drawing Sheets

FIG 2

Relative Test Channel - Address In The Respective Block

| Block | 0 | 1 | 2 | 3 | 4 | 8 | 16 | 17 | 18 | 32 | 64 | 65 | 66 | 67 | 68 | 127 |
|---|---|---|---|---|---|---|---|---|---|---|---|---|---|---|---|---|
| 0 | syn0 | syn1 | syn2 | syn3 | asw0 | asw1 | asw2 | tstch | tstch | asw3 | asw4 | tstch | tstch | tstch | tstch | tstch |
| 1 | asw5 | tstch | tstch | tstch | tstch | tstch | tstch | *payld* | *payld* | tstch | tstch | tstch | tstch | tstch | tstch | tstch |
| 2 | asw6 | tstch | tstch | tstch | tstch | tstch | tstch | *payld* | *payld* | tstch | tstch | tstch | tstch | tstch | tstch | tstch |
| 3 | tstch | tstch | tstch | tstch | tstch | tstch | tstch | *payld* | *payld* | tstch | tstch | tstch | tstch | tstch | tstch | tstch |
| 4 | asw7 | tstch | tstch | UA | tstch | tstch | tstch | *payld* | *payld* | tstch | tstch | tstch | tstch | tstch | tstch | tstch |
| 5 | tstch | tstch | tstch | tstch | tstch | tstch | tstch | *payld* | *payld* | tstch | tstch | tstch | tstch | tstch | tstch | tstch |
| 6 | tstch | tstch | tstch | tstch | tstch | tstch | tstch | *payld* | *payld* | tstch | tstch | tstch | tstch | tstch | tstch | tstch |
| 7 | tstch | tstch | tstch | tstch | tstch | tstch | tstch | *payld* | *payld* | tstch | tstch | tstch | tstch | tstch | tstch | tstch |
| 8 | asw8 | tstch | tstch | tstch | tstch | tstch | tstch | tstch | tstch | tstch | tstch | tstch | tstch | tstch | tstch | tstch |
| 9 | tstch | tstch | tstch | tstch | tstch | tstch | tstch | *payld* | *payld* | tstch | tstch | tstch | tstch | tstch | tstch | tstch |
| 10 | tstch | tstch | tstch | tstch | tstch | tstch | tstch | *payld* | *payld* | tstch | tstch | tstch | tstch | tstch | tstch | tstch |
| 11 | tstch | tstch | tstch | tstch | tstch | tstch | tstch | *payld* | *payld* | tstch | tstch | tstch | tstch | tstch | tstch | tstch |
| 12 | tstch | tstch | tstch | tstch | tstch | tstch | tstch | *payld* | *payld* | tstch | tstch | tstch | tstch | tstch | tstch | tstch |
| 13 | tstch | tstch | tstch | tstch | tstch | tstch | tstch | *payld* | *payld* | tstch | tstch | tstch | tstch | tstch | tstch | tstch |
| 14 | tstch | tstch | tstch | tstch | tstch | tstch | tstch | *payld* | *payld* | tstch | tstch | tstch | tstch | tstch | tstch | tstch |
| 15 | tstch | tstch | tstch | tstch | tstch | tstch | tstch | *payld* | *payld* | tstch | tstch | tstch | tstch | tstch | tstch | tstch |
| 16 | asw9 | tstch | tstch | tstch | tstch | tstch | tstch | *payld* | *payld* | tstch | tstch | tstch | tstch | tstch | tstch | tstch |
| 17 | tstch | tstch | tstch | tstch | tstch | tstch | tstch | *payld* | *payld* | tstch | tstch | tstch | tstch | tstch | tstch | tstch |

APPARATUS AND METHOD FOR MONITORING THE SWITCHING PATHS OF A TIME/SPACE COUPLING NETWORK

BACKGROUND OF THE INVENTION

1. Field of the Invention

The present invention relates to an apparatus and a method for monitoring the switching paths of a time/space coupling network in a coupling network of a telecommunication switching installation.

2. Description of the Related Art

The actual switching or the physical coupling of data channels produced in subscriber terminal devices TE takes place in a coupling network SN (switching network). The coupling network SN itself is typically made up of a multiplicity of time coupling stages for the chronological allocation of the data channels to be switched into respective time slots of a synchronous time-division multiplex system, as well as a multiplicity of space coupling stages for the spatial allocation of the data channels to be switched to the respectively connected lines.

SUMMARY OF THE INVENTION

The invention is based on the object of creating an apparatus and a method for monitoring the switching paths of a time/space coupling network in a coupling network, in order to determine and to remove as quickly as possible faulty switching states or switching channels.

This object is achieved by an apparatus for monitoring switching paths of a time/space coupling network in a coupling network, comprising: an originating address generator for generating an originating address to be switched that is transmitted in a predetermined data channel and is allocated to a predetermined input line of the time/space coupling network; a target value address generator for producing an expected target value address for a predetermined output line of the time/space coupling network; and a comparator apparatus for acquiring and comparing an originating address, switched by the time/space coupling network on the predetermined output line of the time/space coupling network, with the expected target value address.

This object is also achieved by a method for monitoring switching paths of a time/space coupling network in a coupling network, comprising the steps of: production of an originating address to be switched for a predetermined input line of the time/space coupling network; inserting the originating address that is to be switched in a predetermined data channel of a synchronous time-division multiplex system; switching the predetermined data channel in the time/space coupling network to a predetermined output line; producing a target value address for the predetermined output line; acquiring an originating address, switched by the time/space coupling network, on the predetermined output line; and comparing the switched originating address with the target value address.

Particularly through the use of an originating address generator for producing an originating address to be switched, a target value address generator for producing an expected target value address, and a comparator for the acquisition and comparison of a switched originating address with the target value address expected at the output of the time/space coupling network, a monitoring system is obtained with which a respective switching path of the coupling network can reliably be monitored.

The originating address generator preferably consists of a multiplicity of originating address generator units, and the target value address generator preferably consists of a multiplicity of registers, and the comparator apparatus preferably consists of a multiplicity of comparators having appertaining counters. With such a design, a complete monitoring of the switching paths of a coupling network is realized.

Particularly through the insertion of the originating addresses that are to be switched into predetermined test channels of the synchronous time-division multiplex system, a monitoring apparatus is obtained in which the respective switching paths of the time/space coupling network can be tested "online," i.e., during a switching operation. In this way, down time for the overall system can be further reduced, and an error analysis can be carried out using statistical methods.

Advantageous developments of the apparatus include the addition of a counter apparatus for counting comparison results of the comparator apparatus, in which the expected target value address does not agree with the originating address switched by the time/space coupling network. The originating address generator may also comprise a multiplicity of originating address generator units, each of which is allocated to a predetermined input line of the time/space coupling network. The target value address generator may also comprise a multiplicity of registers, each of which is allocated to a predetermined output line of the time/space coupling network. The comparator apparatus may comprise a multiplicity of comparators, each of which is allocated to a predetermined output line of the time/space coupling network. The counter apparatus may comprise a multiplicity of error counters, each of which is allocated to a predetermined output line of the time/space coupling network. The predetermined data channel for transmitting the originating address to be switched can be a test channel. The time/space coupling network may comprise at least a multiplicity of M/N time/space coupling matrices, each of which comprises an originating address generator, a target value address generator, a comparator apparatus, and/or a counter apparatus—any or all of these elements may be realized external to the time/space coupling network.

Advantageous developments of the method include adding a step of incrementing a counter apparatus if a comparison result in the step of comparing the switched originating address does not agree. The step of inserting the original address takes place in a test channel of an encompassing synchronous time-division multiplex system may be performed. The method steps may be executed successively for each input line and output line of the time/space coupling network, or for each time frame of the synchronous time-division multiplex system.

BRIEF DESCRIPTION OF THE DRAWINGS

In the following, the invention is described in more detail on the basis of exemplary embodiments with reference to the drawings.

FIG. 2 is a table showing a simplified representation of a data frame in the synchronous time-division multiplex system according to the present invention.

DESCRIPTION OF THE PREFERRED EMBODIMENTS

Figure 1:
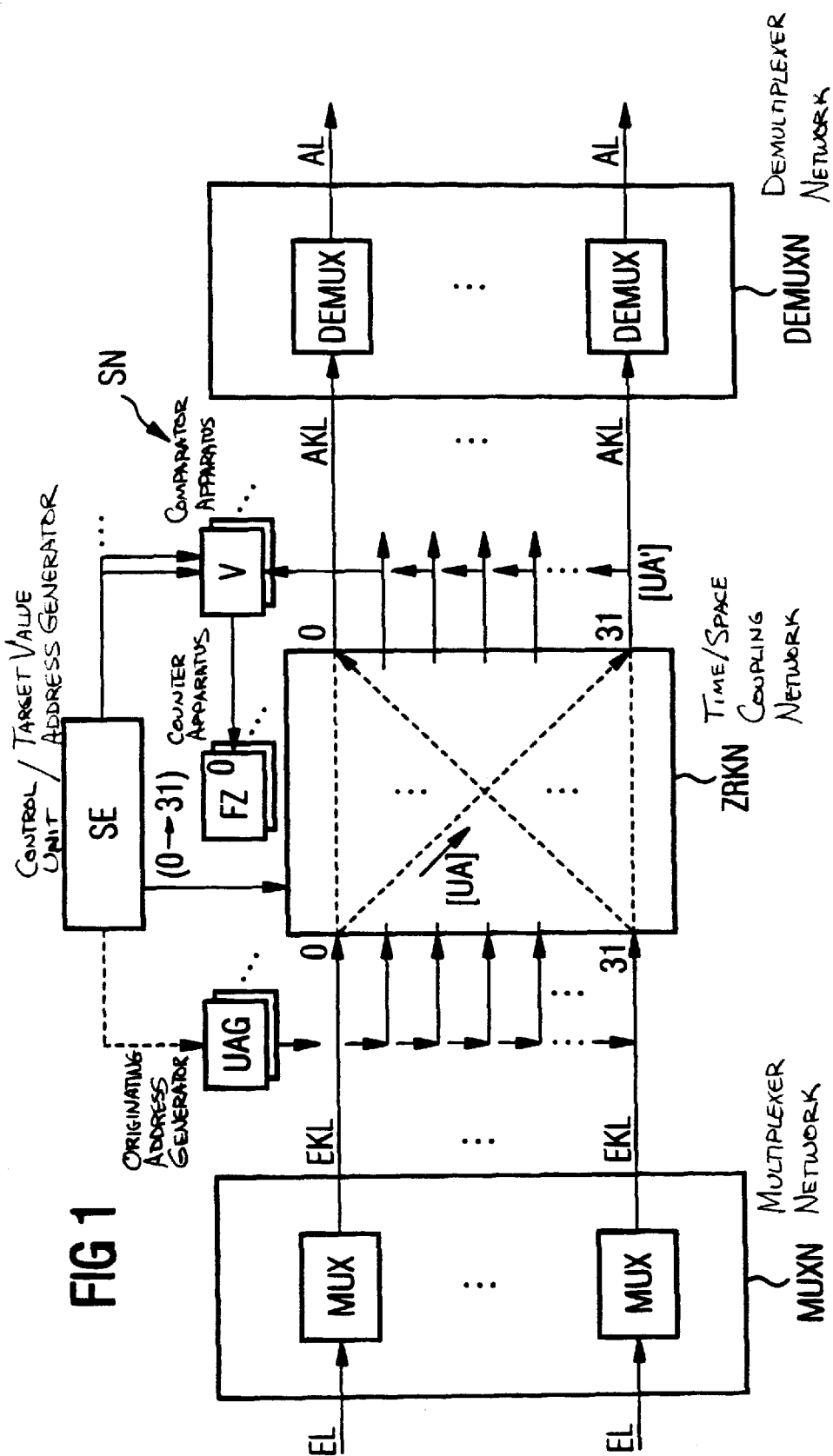
FIG. 1 is a block diagram showing a simplified representation of a coupling network with monitoring modules according to a first exemplary embodiment.

FIG. 1 shows a simplified representation of a coupling network having monitoring modules according to a first inventive exemplary embodiment. The coupling network SN (switching network) according to FIG. 1 essentially consists of a concentrator network that comprises a multiplexer network MUXN and a demultiplexer network DMUXN. Input lines EL lead, for example, from connected line groups LTG (line/trunk group) to respective multiplexer stages MUX, in which a channel compression takes place. Preferably, a multiplexer stage MUX compresses 16 input lines EL, each having a data capacity of 128 data channels (64 kbit/s), and expands them with additional test channels.

FIG. 2 shows a simplified representation of the frame structure as produced by the multiplexer network MUXN or the multiplexer stages MUX of this network. According to FIG. 2, data streams of approximately 184 Mbit/s are switched, where the data streams consist of test channels syn0 to syn3, asw0 to asw9, and tstch, as well as useful channels payld. In FIG. 2, only a segment of the overall frame structure is shown, where, particularly, the relative channel addresses 5 to 7, 9 to 15, 19 to 31, 33 to 63, and 69 to 126 are not shown, for the sake of simplification. The additional useful channels payld in the coupling network are transmitted via these additional relative channel addresses of the synchronous time-division multiplex system.

According to FIG. 2, the synchronous time-division multiplex frame accordingly contains 16×128 useful channels payld, such as are, e.g., transmitted by 16 line groups LTG. In addition, however, the frame structure according to FIG. 2 also includes 2×128=256 test channels tstch, of which at least one (e.g., relative test channel address 3/block 8) is used for the inventive monitoring of the coupling network, as is specified in detail below.

Returning to FIG. 1, a frame structure, for example, shown in FIG. 2 will transmit every 125 microseconds on input coupling network lines EKL to a time/space coupling network ZRKN. The time/space coupling network ZRKN represents the core of the coupling network SN, and is used for the actual chronological and spatial allocation of the respective data channels, i.e., useful channels and test channels. FIG. 1 shows a 32/32 time/space coupling network ZRKN, with which, for example, the data stream of 32 input coupling network lines EKL can be switched to 32 output coupling network lines AKL. The switched data streams or data channels are subsequently decomposed by the demultiplexer network DMUXN into their original form, i.e., 16×128 data channels (having the original data width), and are, for example, supplied via output lines AL to the line groups LTG.

For the monitoring of the time/space coupling network ZRKN, according to FIG. 1, an originating address generator UAG is located at the input of this network for the production of an originating address UA that is to be switched. This address is transmitted in a predetermined data channel and allocated to a predetermined input line EKL of the time/space coupling network ZRKN. For a switching of, for example, the input coupling network line EKL0 to the output coupling network line AKL31, an originating address UA=0, for example, is accordingly entered in a predetermined data channel of the input coupling network line EKL0, and is transmitted from the time/space coupling network ZRKN to the output coupling network line AKL31 via time coupling stages and space coupling stages (not shown).

A target value address generator, preferably realized by a control unit SE and its register, for this purpose produces an expected target value address UA=0 for the output coupling network line AKL31, on which, for error-free switching, an originating address UA'=0 is output by the time/space coupling network ZRKN. A comparator apparatus V then acquires the originating address UA'=0 switched by the time/space coupling network ZRKN, and compares it with the target value address UA=0 stored in the register of the control unit SE or, respectively, produced by the target value address generator. If the two data values agree, an error-free switching has been carried out from a respective input coupling network line EKL to a respective output coupling network line AKL. In this way, the switching path can be tested reliably.

The comparator apparatus V preferably controls a counter apparatus FZ for counting comparison results of the comparator apparatus V, where a counter is incremented upward by 1 for each lack of agreement between an expected target value address and a switched originating address. The counter value of the counter apparatus is therefore a measure of the quality of a respective switching path in the time/space coupling network ZRKN.

According to FIG. 1, each of the input coupling network lines EKL preferably has an originating address generator unit for producing an originating address UA that is to be switched for the respective input coupling network line EKL. In the same way, the comparator apparatus V has a multiplicity of comparators that are each allocated to one output coupling network line AKL of the time/space coupling network ZRKN. If, in addition, a multiplicity of error counters for the counter apparatus FZ and a multiplicity of registers for the target value address generator SE are allocated to the respective output coupling network lines AKL, a monitoring system is obtained that enables a complete test of the functioning of the time/space coupling network ZRKN.

Specifically, for suitable programming of the control unit SE, any arbitrarily selected switching path in the time/space coupling network ZRKN can be controlled in which the respective originating address generator units of the originating address generator UAG produce the originating addresses UA allocated to the respective input coupling network lines EKL and insert them into one or more predetermined data channels, for example, of the frame structure according to FIG. 2. At the output side, the originating addresses UA' transmitted into the data channels and switched by the time/space coupling network ZRKN are compared with their associated target value addresses UA, and, for a lack of agreement, the respectively associated error counter is incremented. In particular, sporadically occurring or statistically distributed switching errors (caused, for example, by defective speech memory units) can in this way be reliably determined and localized, thus realizing an improved monitoring of the coupling network SN.

In the coupling network SN according to FIG. 1, a frame structure according to FIG. 2 having a plurality of test channels tstch is preferably used, in which a predetermined test channel, e.g., relative test channel address 3/block 8 (i.e., position 1027) is used for the insertion of the originating addresses UA. In this way, an "ONLINE" test of the coupling network SN or, respectively, of its time/space coupling network ZRKN during a running switching operation is enabled, since the actual useful channels payld are switched by the monitoring system without being influenced, and only the predetermined test channel (UA) carries out the monitoring of the time/space coupling network ZRKN.

For suitable controlling of the time/space coupling network ZRKN, i.e., for cyclical scanning of all input coupling network lines EKL and output coupling network lines AKL, one thus obtains a successively executed test of all switching paths in the time/space coupling network ZRKN. In this way, without influencing the actual useful channel switching, a great variety of statistical analyses for monitoring or testing of the time/space coupling network ZRKN can be realized in the coupling network SN.

In the same way, for a multiplicity of successive frame structures according to FIG. 2, the respective input coupling network lines EKL and output coupling network lines AKL or their switching channels, can be scanned repeatedly, thus resulting in a permanent online monitoring of the coupling network SN or the time/space coupling network.

Figure 3:
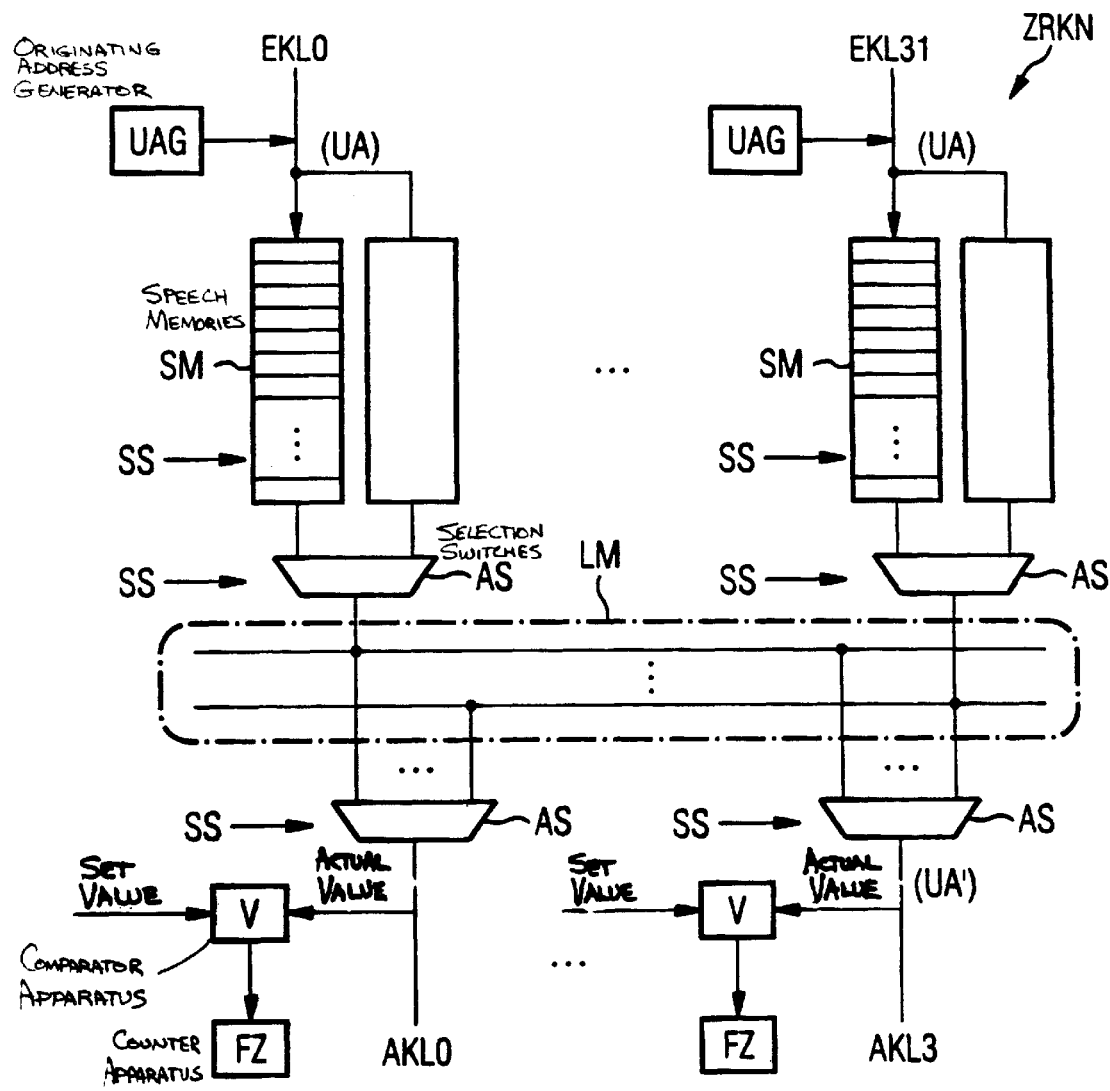
FIG. 3 is a block diagram showing a simplified representation of a time/space coupling network having monitoring modules according to a second inventive exemplary embodiment.

FIG. 3 shows a simplified representation of a part of the time/space coupling network ZRKN having monitoring modules according to a second inventive exemplary embodiment. According to FIG. 3, if the time/space coupling network is realized by a multiplicity of time/space coupling stages, the inventive monitoring apparatus can also be realized by monitoring modules that are located inside the time/space coupling network ZRKN.

FIG. 3 shows a time/space coupling network having a 32/4 time/space coupling matrix ZRKM, in which 32 input coupling network lines EKL0 to EKL31 are connected to four output coupling network lines AKL0 to AKL3. In FIG. 3, identical reference characters designate identical or similar components to those already discussed.

The time/space coupling matrix ZRKM according to FIG. 3 essentially consists of a multiplicity of speech memories SM and a multiplicity of selection switches AS that are respectively controlled via control signals SS. The speech memories SM essentially consist of RAM (random access memory) memory circuits for storing the respective data channels, i.e., test channels and useful channels of the synchronous time-division multiplex system, e.g., the frame structure shown in FIG. 2. The speech memories SM essentially realize a chronological allocation in the coupling network.

The spatial allocation is essentially realized by the selection switch AS of the last stage, in connection with an appertaining line matrix LM, by which one obtains a switching path of, for example, a predetermined input coupling network line EKL to a predetermined output coupling network line AKL. In contrast to the first exemplary embodiment according to FIG. 1, the originating address generator units of the originating address generator UAG are located immediately at the input of the time/space coupling matrix ZRKM, and are preferably realized in a matching circuit (not shown) for matching non-synchronous input signals to synchronous input signals.

In the same way, the respective comparators of the comparator apparatus V, as well as the associated error counters of the counter apparatus FZ, can be constructed immediately in the time/space coupling matrix ZRKM or can be connected to its output coupling network lines AKL0 to AKL3. The control unit SE can be integrated completely or partially in the module realizing the time/space coupling matrix ZRKM, and preferably consists of registers comprising an originating address UA that is to be expected for respective output coupling network lines AKL0 to AKL3. In its further details, the monitoring apparatus according to FIG. 3 essentially corresponds to the previously discussed monitoring apparatus according to FIG. 1.

The invention has been specified above on the basis of specific time/space coupling networks. However, it is not limited to these, and rather comprises all additional time/space coupling networks that are constructed from a multiplicity of time/space coupling stages. In addition, the present invention has been specified on the basis of a specific frame structure of the synchronous time-division multiplex system. However, the invention is not limited to this, and rather comprises all additional frame structures in which a data channel is used according to the invention for monitoring the time/space coupling network. The above-described method and apparatus are illustrative of the principles of the present invention. Numerous modifications and adaptations thereof will be readily apparent to those skilled in this art without departing from the spirit and scope of the present invention.

What is claimed is:

1. An apparatus for monitoring switching paths of a time/space coupling network in a coupling network, comprising:
   an originating address generator for generating an originating address to be switched that is transmitted in a predetermined data channel and is allocated to a predetermined input line of said time/space coupling network;
   a target value address generator for producing an expected target value address for a predetermined output line of said time/space coupling network; and
   a comparator apparatus for acquiring and comparing an originating address, switched by said time/space coupling network on said predetermined output line of said time/space coupling network, with said expected target value address.

2. The apparatus according to claim 1, further comprising a counter apparatus for counting comparison results of said comparator apparatus, in which said expected target value address does not agree with said originating address switched by said time/space coupling network.

3. The apparatus according to claim 1, wherein said originating address generator comprises a multiplicity of originating address generator units, each of which is allocated to a predetermined input line of said time/space coupling network.

4. The apparatus according to claim 1, wherein said target value address generator comprises a multiplicity of registers, each of which is allocated to a predetermined output line of said time/space coupling network.

5. The apparatus according to claim 1, wherein said comparator apparatus comprises a multiplicity of comparators, each of which is allocated to a predetermined output line of said time/space coupling network.

6. The apparatus according to claim 2, wherein said counter apparatus comprises a multiplicity of error counters, each of which is allocated to a predetermined output line of said time/space coupling network.

7. The apparatus according to claim 1, wherein said predetermined data channel for transmitting said originating address to be switched represents a test channel.

8. The apparatus according to claim 1, wherein said time/space coupling network comprises at least a multiplicity of M/N time/space coupling matrices, each of which comprises an element selected from the group consisting of an originating address generator, a target value address generator, a comparator apparatus, and a counter apparatus.

9. The apparatus according to claim 1, wherein an element selected from the group consisting of at least a part of said originating address generator, said target value address generator, said comparator apparatus, and a counter apparatus, is realized external to the time/space coupling network.

10. A method for monitoring switching paths of a time/space coupling network in a coupling network, comprising the steps of:

production of an originating address to be switched for a predetermined input line of said time/space coupling network;

inserting said originating address that is to be switched in a predetermined data channel of a synchronous time-division multiplex system;

switching said predetermined data channel in said time/space coupling network to a predetermined output line;

producing a target value address for said predetermined output line;

acquiring an originating address, switched by said time/space coupling network, on said predetermined output line; and comparing said switched originating address with said target value address.

11. The method according to claim 10, further comprising the step of incrementing a counter apparatus if a comparison result in said step of comparing said switched originating address does not agree.

12. The method according to claim 10, wherein the step of inserting said original address takes place in a test channel of an encompassing synchronous time-division multiplex system.

13. The method according to claim 10, wherein all steps are executed successively for each input line and output line of said time/space coupling network.

14. The method according to claim 10, wherein all steps are executed successively for each time frame of said synchronous time-division multiplex system.

* * * * *